US012587066B1

(12) United States Patent

Sily et al.

(10) Patent No.: US 12,587,066 B1

(45) Date of Patent: Mar. 24, 2026

(54) WEARABLE ENERGY HARVESTING DEVICE

(71) Applicant: PRINCE MOHAMMAD BIN FAHD UNIVERSITY, Dhahran (SA)

(72) Inventors: Omar Sily, Dhahran (SA); Fatima Amsseri, Dhahran (SA); Hala Alherz, Dhahran (SA); Jood Alharbi, Dhahran (SA); Haleema Al-Muneef, Dhahran (SA); Wafa Al-Dossary, Dhahran (SA); Jalilah Alforehe, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/276,780

(22) Filed: Jul. 22, 2025

(51) Int. Cl.
  *H02K 7/18* (2006.01)
  *H02J 7/14* (2006.01)
  *H02K 7/02* (2006.01)

(52) U.S. Cl.
  CPC .............. *H02K 7/1861* (2013.01); *H02J 7/14* (2013.01); *H02K 7/02* (2013.01)

(58) Field of Classification Search
  CPC ............ H02K 7/1861; H02K 7/02; H02J 7/14
  USPC ........................................................... 310/74
  See application file for complete search history.

(56) References Cited

U.S. PATENT DOCUMENTS

| | | | | |
|---|---|---|---|---|
| 8,716,877 B2 * | 5/2014 | Sugar | .................... | H02K 35/02 |
| | | | | 290/1 R |
| 9,212,649 B2 * | 12/2015 | Heim | .................. | F03B 13/1815 |
| 9,597,217 B2 * | 3/2017 | Patton | .................... | A61F 5/0125 |
| 9,943,460 B2 * | 4/2018 | Roh | .......................... | A61H 3/00 |
| 10,154,936 B2 * | 12/2018 | Choi | ..................... | A61H 1/0244 |
| 10,342,724 B2 * | 7/2019 | Choi | ......................... | B25J 17/00 |
| 10,485,681 B2 * | 11/2019 | Herr | .......................... | A61F 2/70 |
| 10,548,755 B2 * | 2/2020 | Takenaka | .............. | A61F 5/0102 |
| 10,843,332 B2 * | 11/2020 | Walsh | .................... | B25J 9/0006 |

(Continued)

FOREIGN PATENT DOCUMENTS

| | | |
|---|---|---|
| CN | 105003401 B | 10/2018 |
| CN | 117145715 A | 12/2023 |

(Continued)

OTHER PUBLICATIONS

Young-Man Choi, et al., "Wearable Biomechanical Energy Harvesting Technologies", Energies 2017, vol. 10, Sep. 25, 2017, 17 pages.

*Primary Examiner* — Alex W Mok

(74) *Attorney, Agent, or Firm* — Oblon, McClelland, Maier & Neustadt, L.L.P.

(57) ABSTRACT

A wearable energy harvesting device includes a harness to be attached to a human leg, the harness has upper and lower portions, each with inner and outer support members for placement along the human leg. The upper outer support member is connected to the lower outer support member by an outer hinge and the upper inner support member is connected to the lower inner support member by an inner hinge. A pendulum assembly attached to the harness oscillates in response to human body motion. The pendulum assembly includes a pendulum, a flywheel mechanically coupled to the pendulum, pulleys including a first pulley mechanically connected to the flywheel and a second pulley having smaller diameter mechanically connected to a ratchet gear, a belt connecting the pulleys, and an electromagnetic generator coupled to the ratchet gear.

15 Claims, 14 Drawing Sheets

(56) References Cited

U.S. PATENT DOCUMENTS

| 10,980,700 | B2 * | 4/2021 | Lee | A61H 1/0244 |
|---|---|---|---|---|
| 11,464,700 | B2 * | 10/2022 | Asbeck | A63B 23/03508 |
| 2002/0094919 | A1 * | 7/2002 | Rennex | A63B 25/00 |
| | | | | 482/124 |
| 2007/0298935 | A1 * | 12/2007 | Badarneh | A63B 22/0605 |
| | | | | 482/52 |
| 2010/0011890 | A1 | 1/2010 | Tseng | |
| 2011/0040216 | A1 * | 2/2011 | Herr | B25J 9/0006 |
| | | | | 601/34 |
| 2014/0152008 | A1 | 6/2014 | Donelan et al. | |
| 2015/0069761 | A1 * | 3/2015 | Heim | F03B 13/1815 |
| | | | | 290/53 |
| 2017/0267105 | A1 * | 9/2017 | Fratelli | B60L 15/20 |
| 2018/0125692 | A1 * | 5/2018 | Takenaka | A61F 5/0102 |
| 2022/0226182 | A1 * | 7/2022 | Koginov | A61F 2/741 |

FOREIGN PATENT DOCUMENTS

| KR | 100244934 | B1 * | 2/2000 | H01M 10/46 |
|---|---|---|---|---|
| WO | WO-2012093923 | A1 * | 7/2012 | H02K 53/00 |
| WO | WO-2014091005 | A1 * | 6/2014 | H02K 35/02 |

* cited by examiner

144

160

144

146

160

146

WEARABLE ENERGY HARVESTING DEVICE

BACKGROUND

Technical Field

The present disclosure relates to wearable energy harvesting systems, and more particularly to pendulum-based energy harvesting devices configured to convert human body motion into electrical energy for powering portable electronic devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Energy harvesting methods include mechanisms which can extract useful energy from moving machinery or humans. Some of the possible methods which can be used for this purpose include flexible silicon based solar cells which convert solar energy to electrical energy, fiber based storage devices using conductive fibers like metals or polymers to save energy, backpack based energy harvesting systems, flexible energy storage devices, and flexible photo charging systems which recharge batteries. These existing approaches have demonstrated the feasibility of capturing ambient energy for practical applications. However, the implementation of these technologies in wearable formats presents ongoing challenges related to efficiency, comfort, and practical utility for everyday use.

Current energy harvesting approaches face several limitations when applied to wearable applications. Manual effort is often required for some systems, reducing their appeal for continuous use during daily activities. Comfort and wearability issues arise when devices are bulky, heavy, or interfere with natural body movement patterns. Efficiency limitations restrict the amount of power that can be generated from available human motion, limiting the practical applications for harvested energy. Size and weight constraints further complicate the integration of effective energy harvesting systems into comfortable, practical wearable devices that users will accept for regular use.

One promising approach involves pendulum-based energy harvesting which uses the motion of a pendulum to convert vibrational energy into rotational energy which can then be used to drive an electric generator. The heart of a pendulum-based energy harvester lies in the mechanism that transforms the pendulum motion into electricity, typically involving an electromagnetic generator where a magnet moves in relation to a coil to induce electric current. Known solutions have explored various configurations for integrating pendulum systems into wearable formats, including wristband applications and insole implementations. These systems generally rely on electromagnetic induction principles to convert mechanical motion into electrical energy through relative movement between magnetic and conductive components.

Existing pendulum-based energy harvesting systems suffer from several limitations that reduce their effectiveness for practical wearable applications. Many lack effective speed amplification systems, resulting in low rotational speeds that produce minimal electrical output from the electromagnetic generators. Poor integration with comfortable harness systems makes these devices cumbersome to wear and limits user acceptance for daily use. Inadequate motion capture from human leg movement reduces the efficiency of energy conversion during normal walking activities. Limited power output restricts the practical applications for harvested energy, making these systems unsuitable for powering commonly used portable electronic devices. The combination of these limitations has prevented widespread adoption of pendulum-based wearable energy harvesting systems.

For instance, US20100011890A1 describes an oscillating power generator that includes a base, an energy transforming device disposed on the base for generating electric energy, and an oscillating transmission device disposed on the base for driving a driven gear shaft of the energy transforming device. The oscillating transmission device includes an oscillating part disposed outside the base in an oscillating manner, a first ratchet transmission mechanism engaged with the driven gear shaft, and a transmission mechanism connected to the oscillating part and the first ratchet transmission mechanism for driving the first ratchet transmission mechanism when the oscillating part is oscillating.

US20140152008A1 describes a method and apparatus for harvesting energy from motion of one or more joints, comprising a generator for converting mechanical energy into corresponding electrical energy, one or more sensors for sensing characteristics associated with motion of the joints, and control circuitry configured to assess whether motion of the joints is associated with mutualistic or non-mutualistic conditions. The energy harvesting apparatus can be mounted across a knee joint with an upper component located above the knee joint, a lower component located below the knee joint, and a pivot joint located generally coaxially with the knee joint.

CN117145715A describes a power generation device using leg movement, comprising a shell, a generator, a swinging rod and a contact groove, wherein the rotor of the generator is fixed with a driven gear, the driven gear is engaged with a swinging gear, the swinging gear is connected at one end of the swinging rod, and the other end of the swinging rod is hinged with a contact groove. The driven gear includes a ratchet wheel so that the rotor of the generator and the driven gear only rotate in one direction when rotating back and forth.

CN105003401B describes a leg motion energy collection device comprising a shell, a generator and potentiometer fixed in the shell, wherein the generator rotor is fixed with a working gear and rotationally connected with a first rotating shaft at the inner side bottom of the shell. The first rotating shaft is fixed with a swing rod and a sector gear, with a gear gearbox for acceleration provided between the sector gear and working gear.

Each of the aforementioned systems suffers from one or more drawbacks hindering their adoption, such as inadequate attachment systems that fail to provide comfortable and secure mounting during extended use, insufficient speed amplification mechanisms that limit power generation efficiency, lack of integrated design approaches that compromise portability and user acceptance, poor energy conversion efficiency due to suboptimal mechanical coupling between human motion and generation systems, and limited practical applicability for real-world wearable applications due to bulky or uncomfortable configurations. Accordingly, it is one object of the present disclosure to provide a wearable energy harvesting device that integrates a comfortable harness system with an efficient pendulum-based energy conversion mechanism, and a method of harvesting energy from human body motion that maximizes energy capture while minimizing user burden.

SUMMARY

In an aspect, a wearable energy harvesting device is provided comprising a harness configured to be attached to a human leg, the harness comprising an upper portion and a lower portion, wherein each of the upper and lower portions have an inner support member and an outer support member, the inner support members configured for placement along an inside of the human leg and the outer support members configured for placement along an outside of the human leg opposite the inner support members, wherein the upper outer support member is connected to the lower outer support member by an outer hinge and the upper inner support member is connected to the lower inner support member by an inner hinge, a pendulum assembly attached to the harness and configured to oscillate in response to human body motion, the pendulum assembly comprising a pendulum, a flywheel mechanically coupled to the pendulum, a plurality of pulleys including at least a first pulley mechanically connected to the flywheel and a second pulley having a smaller diameter than the first pulley and mechanically connected to a ratchet gear, a belt connecting the first pulley to the second pulley, an electromagnetic generator mechanically coupled to the ratchet gear assembly.

In some embodiments, the pendulum comprises a pendulum mass and a pendulum rod having a first end and a second end, wherein the pendulum mass is attached to the first end and the second end is pivotally connected to the flywheel.

In some embodiments, the flywheel is concentrically mounted with the first pulley to form a unified rotating assembly.

In some embodiments, the electromagnetic generator comprises a magnet assembly and a coil assembly configured for electromagnetic induction.

In some embodiments, the upper portion further comprises a plurality of upper straps, the lower portion further comprises a plurality of lower straps.

In some embodiments, the wearable energy harvesting device further comprises an energy storage element electrically connected to the electromagnetic generator, wherein the energy storage element is selected from the group consisting of a rechargeable battery and a supercapacitor.

In some embodiments, the first pulley has a larger diameter than the second pulley to provide rotational speed amplification.

In some embodiments, the wearable energy harvesting device further comprises an energy management circuit electrically connected to the electromagnetic generator.

In some embodiments, the wearable energy harvesting device is configured to power an external electronic device selected from the group consisting of a mobile phone charger, a smartwatch, a fitness tracker, and a portable fan.

In some embodiments, the electromagnetic generator comprises an output shaft extending therefrom to the ratchet gear.

In some embodiments, the ratchet gear is directly connected to the second pulley, and the electromagnetic generator is positioned at a distance from the ratchet gear and the second pulley corresponding to a length of the output shaft.

In some embodiments, the pendulum assembly is mounted on the lower portion of the harness.

In some embodiments, the pendulum assembly is pivotally mounted at the joint between the upper portion and the lower portion.

In some embodiments, each pulley of the plurality of pulleys comprises a circumferential groove configured to receive the belt.

In some embodiments, the lower portion of the harness comprises a mounting bracket, and wherein the electromagnetic generator is mounted on the mounting bracket.

In another aspect, a method of harvesting energy from human body motion using the wearable energy harvesting device is provided, the method comprising oscillating the pendulum assembly in response to human body motion, transferring oscillatory motion from the pendulum to the flywheel and through the pulleys to amplify rotational speed, and generating electrical energy using the amplified rotational motion.

In some embodiments, the method further comprises converting bidirectional rotation of the pendulum to unidirectional rotation with the ratchet gear, wherein the unidirectional rotation drives the electromagnetic generator.

In some embodiments, the method further comprises storing the electrical energy in an energy storage device.

In some embodiments, the electrical energy is directed through the energy management circuit to an external device.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
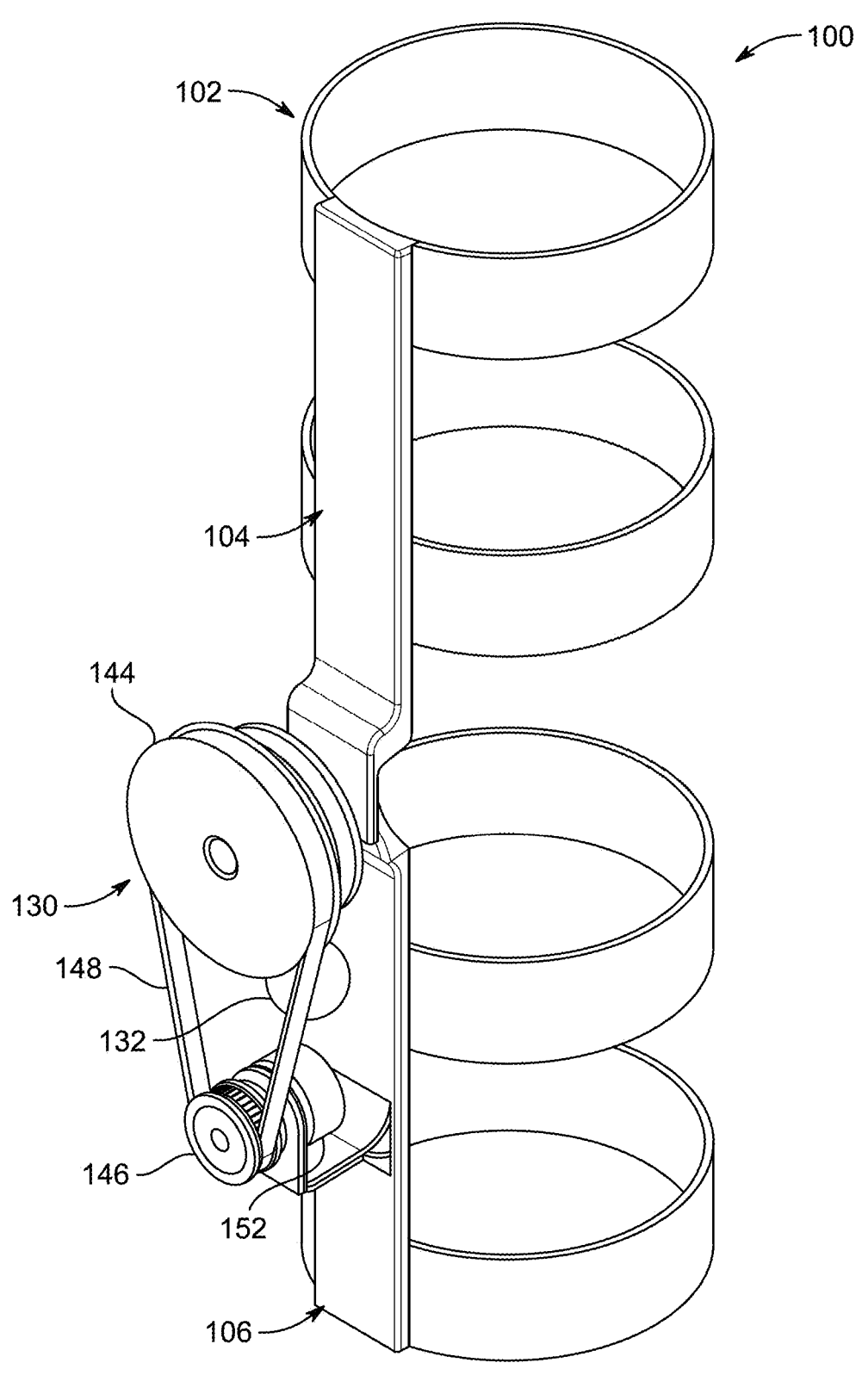
FIG. 1A is an exemplary perspective view of a wearable energy harvesting device, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a wearable energy harvesting device comprising a harness configured to be attached to a human leg and a pendulum assembly attached to the harness and configured to oscillate in response to human body motion, and a method of harvesting energy from human body motion using the wearable energy harvesting device. The wearable energy harvesting device integrates multiple mechanical and electrical systems within a compact package that can effectively capture kinetic energy from human walking motion and convert it into electrical energy suitable for powering portable electronic devices or charging energy storage systems.

Figure 1B:
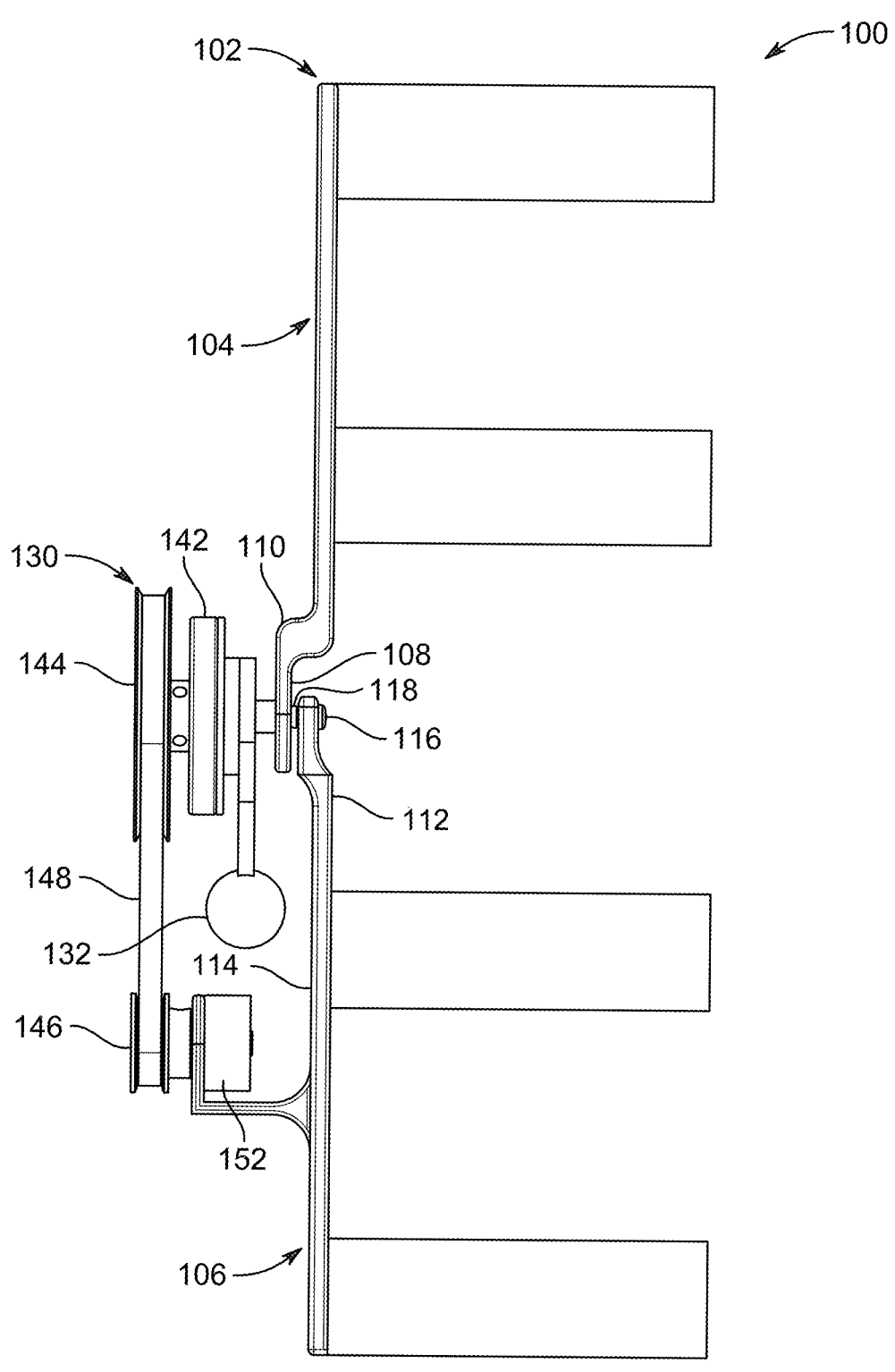
FIG. 1B is an exemplary side view of the wearable energy harvesting device of FIG. 1A, according to certain embodiments.

Referring to FIGS. 1A and 1B, illustrated is an embodiment of a wearable energy harvesting device 100 for converting human body motion into electrical energy. The wearable energy harvesting device 100 of the present disclosure represents a mechanical system that combines a harness attachment mechanism with an integrated pendulum-based energy conversion assembly to provide efficient and comfortable energy harvesting from human leg motion. The wearable energy harvesting device 100 incorporates multiple interconnected mechanical components including a flywheel, speed amplification pulleys, and electromagnetic generation systems that work together to optimize energy transfer from low-frequency human motion to high-efficiency electrical power generation. The wearable energy harvesting device 100 integrates comfort and wearability considerations with mechanical efficiency requirements, creating a practical solution for powering mobile electronic devices, smartwatches, fitness trackers, and portable fans through energy harvested from normal walking activities. The wearable energy harvesting device 100 provides a self-contained energy generation system that operates continuously during walking without requiring conscious user input or significantly altering natural gait patterns, making it suitable for extended daily use applications.

As illustrated, the wearable energy harvesting device 100 comprises a harness 102 configured to be attached to a human leg, providing a secure and comfortable mounting platform for the energy harvesting components. The harness 102 includes structural elements designed to distribute the weight of the energy harvesting system across multiple contact points on the human leg, reducing pressure concentrations and enhancing user comfort during extended wear. The configuration of the harness 102 facilitates natural leg movement while maintaining proper positioning of the energy harvesting components relative to the motion patterns generated during walking. The wearable energy harvesting device 100 integrates multiple mechanical and electrical systems within a compact, lightweight package that can be worn during normal daily activities.

Figure 2A:
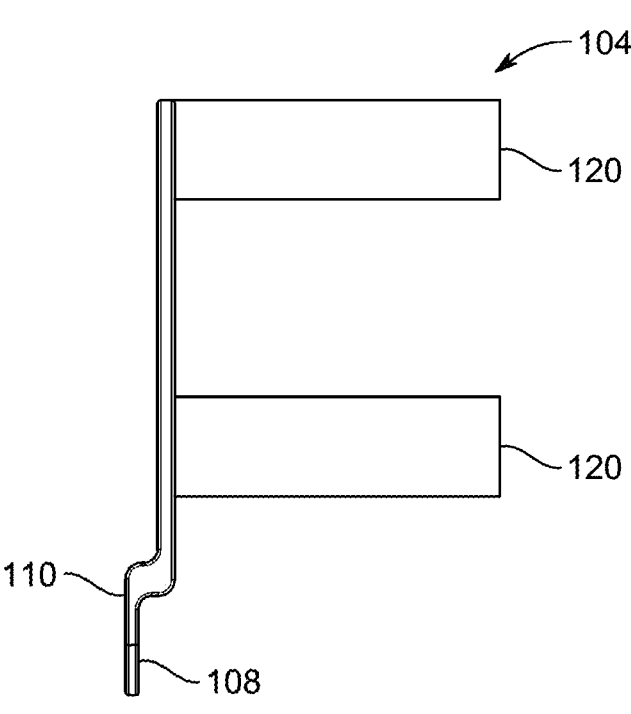
FIG. 2A is an exemplary side view of an upper portion of a harness of the wearable energy harvesting device, according to certain embodiments.
Figure 2B:
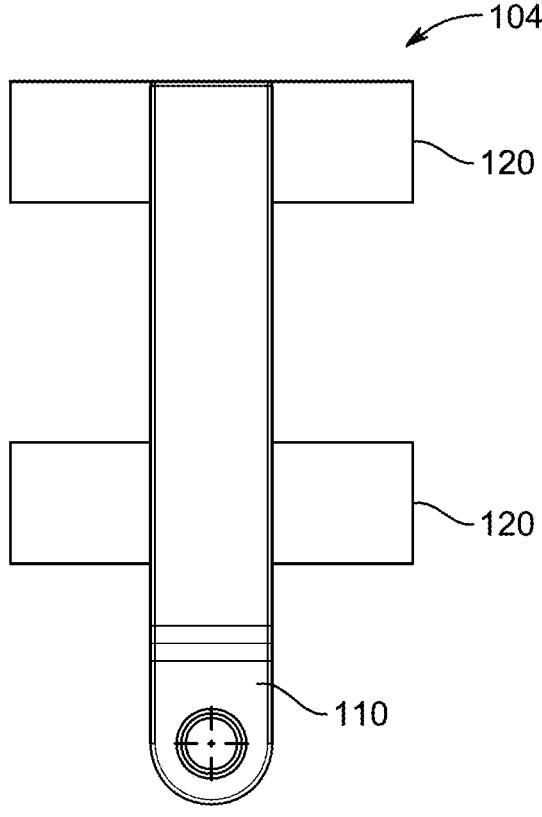
FIG. 2B is an exemplary front view of the upper portion of the harness of FIG. 2A, according to certain embodiments.
Figure 3A:
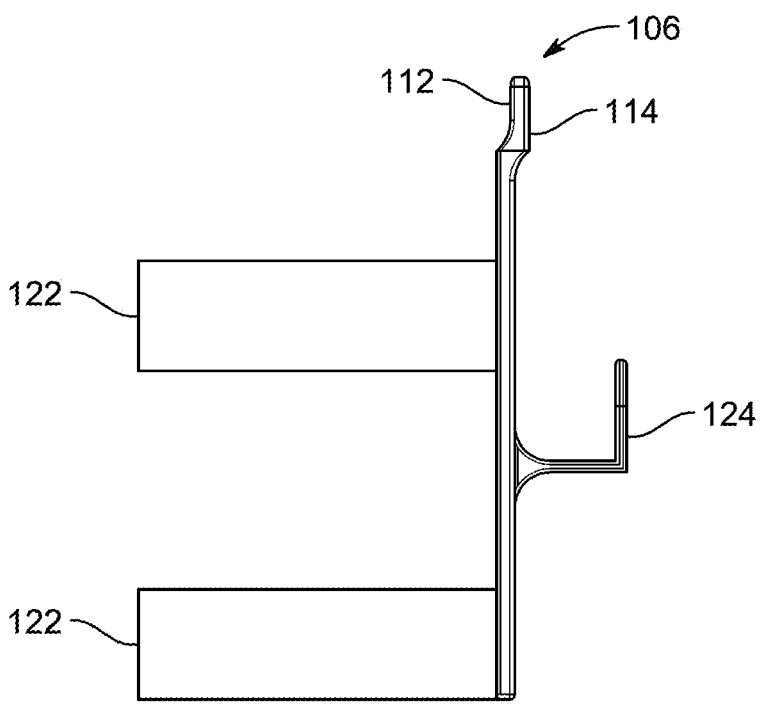
FIG. 3A is an exemplary side view of a lower portion of a harness of the wearable energy harvesting device, according to certain embodiments.
Figure 3B:
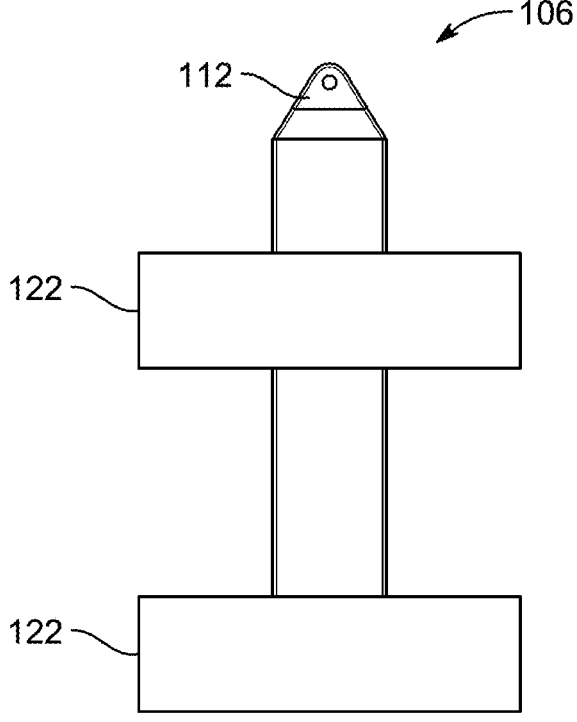
FIG. 3B is an exemplary front view of the lower portion of the harness of FIG. 3A, according to certain embodiments.

Herein, the harness 102 comprises an upper portion 104 (shown in FIGS. 2A and 2B in more detail) and a lower portion 106 (shown in FIGS. 3A and 3B in more detail). Each of the upper and lower portions 104, 106 have an inner support member and an outer support member. In particular, the upper portion 104 includes an upper inner support member 108 and an upper outer support member 110, while the lower portion 106 includes a lower inner support member 112 and a lower outer support member 114. The inner support members 108, 112 are configured for placement along an inside of the human leg, conforming to the natural contours of the inner leg surface to provide stable contact without interfering with leg-to-leg contact during walking. The outer support members 110, 114 are configured for placement along an outside of the human leg opposite the inner support members 108, 112, creating a clamping arrangement that securely positions the harness 102 on the leg. This dual-sided support configuration distributes attachment forces across both inner and outer leg surfaces, preventing the harness 102 from rotating or shifting position during dynamic movement.

The structural integrity and flexibility of the harness 102 are maintained through articulated connections between the upper and lower portions 104, 106. The upper outer support member 110 is connected to the lower outer support member 114 by an outer hinge 116 (generally represented in FIG. 1B), providing controlled articulation that accommodates knee flexion during walking, running, and other leg movements. Similarly, the upper inner support member 108 is connected to the lower inner support member 112 by an inner hinge 118 (generally represented in FIG. 1B), creating a symmetric articulation system that maintains proper alignment of both inner and outer support elements throughout the range of leg motion. The outer hinge 116 and the inner hinge 118 are positioned to align approximately with the natural axis of knee rotation, ensuring that the harness 102 moves in harmony with the user leg motion rather than restricting or altering natural movement patterns. This hinged configuration allows the harness 102 to accommodate the complex three-dimensional motion of the knee joint while maintaining secure attachment and proper positioning of the energy harvesting components.

The upper portion 104 further comprises a plurality of upper straps or cuffs 120, and the lower portion 106 further comprises a plurality of lower straps or cuffs 122. The upper straps 120 are strategically positioned around the upper portion 104 to provide adjustable circumferential compression around the upper leg, typically in the thigh region, allowing the harness 102 to accommodate different leg diameters and shapes while maintaining secure attachment. The lower straps 122 are similarly positioned around the lower portion 106 to provide adjustable compression around the lower leg, typically in the calf region, creating multiple points of secure attachment that prevent vertical migration of the harness 102 during use. The plurality of upper straps 120 and lower straps 122 may include adjustable buckles, hook-and-loop fasteners, snap fits, lever lock clamp rings or other adjustable closure mechanisms that allow users to customize the fit and compression level according to their comfort preferences and anatomical requirements. The strap configuration distributes attachment forces across broad surface areas, reducing pressure concentrations that could cause discomfort during extended wear periods.

The lower portion 106 of the harness 102 comprises a mounting bracket 124 (as better shown in FIG. 3A), and an electromagnetic generator 152 (as discussed later in detail) is mounted on the mounting bracket 124. The mounting bracket 124 provides a rigid platform for supporting the weight and operational forces of the electromagnetic generator 152, ensuring stable positioning relative to the other components of the energy harvesting system. The mounting bracket 124 is integrated into the structural framework of the lower portion 106, distributing the weight and inertial forces of the electromagnetic generator 152 across the entire lower portion rather than concentrating these forces at a single attachment point. The mounting bracket 124 positions the electromagnetic generator 152 at an optimal location relative to the user center of mass and leg motion patterns, minimizing the impact on natural gait while maximizing the energy harvesting efficiency of the system. This configuration reduces stress concentrations in the harness structure and improves the durability of the mounting system under repeated loading cycles.

Referring still to FIGS. 1A and 1B, the wearable energy harvesting device 100 further comprises a pendulum assembly 130 attached to the harness 102 and configured to oscillate in response to human body motion. The pendulum assembly 130 includes multiple interconnected mechanical components that work together to capture kinetic energy from leg motion and convert it into rotational energy suitable for driving the electromagnetic generator 152. The pendulum assembly 130 is designed to respond to the acceleration patterns generated during normal walking, where the leg undergoes complex acceleration and deceleration cycles as it swings forward and contacts the ground. The oscillatory motion of the pendulum assembly 130 is initiated and sustained by these acceleration patterns, creating a continuous source of mechanical energy that can be harvested throughout the walking cycle. The pendulum assembly 130 is mechanically isolated from the harness 102 through appropriate bearings or pivotal connections (as discussed later), allowing it to respond freely to inertial forces while remaining securely attached to the overall system.

As illustrated, the pendulum assembly 130 is mounted on the lower portion 106 of the harness 102, positioning the oscillating components in the region of the leg that experiences the most pronounced acceleration patterns during walking. The lower leg region undergoes significant acceleration changes as the foot contacts the ground and as the leg swings through its stride cycle, providing optimal excitation for the pendulum assembly 130. Mounting the pendulum assembly 130 on the lower portion 106 also positions the mass of the energy harvesting components closer to the foot, which typically has less impact on user comfort and gait patterns compared to mounting heavier components higher on the leg. The mounting configuration allows the pendulum assembly 130 to swing in a generally vertical plane, responding to both forward-backward and vertical acceleration components of the leg motion. This mounting arrangement provides sufficient coupling between the leg motion and the pendulum response, maximizing the energy transfer efficiency of the system.

In an alternative configuration, the pendulum assembly 130 is pivotally mounted at the joint between the upper portion 104 and the lower portion 106. This mounting configuration positions the pendulum assembly 130 at the location of maximum articulation in the harness system, where the relative motion between the upper and lower portions 104, 106 creates additional excitation for the pendulum oscillation. The pivotal mounting at the joint allows the pendulum assembly 130 to respond not only to overall leg acceleration but also to the relative motion between the thigh and calf regions during knee flexion and extension. This configuration can provide enhanced energy harvesting efficiency during activities that involve significant knee motion, such as stair climbing or variable-speed walking. The joint mounting also centralizes the mass of the energy harvesting components at the knee level, which may provide better balance and weight distribution for some users and applications.

Figure 4A:
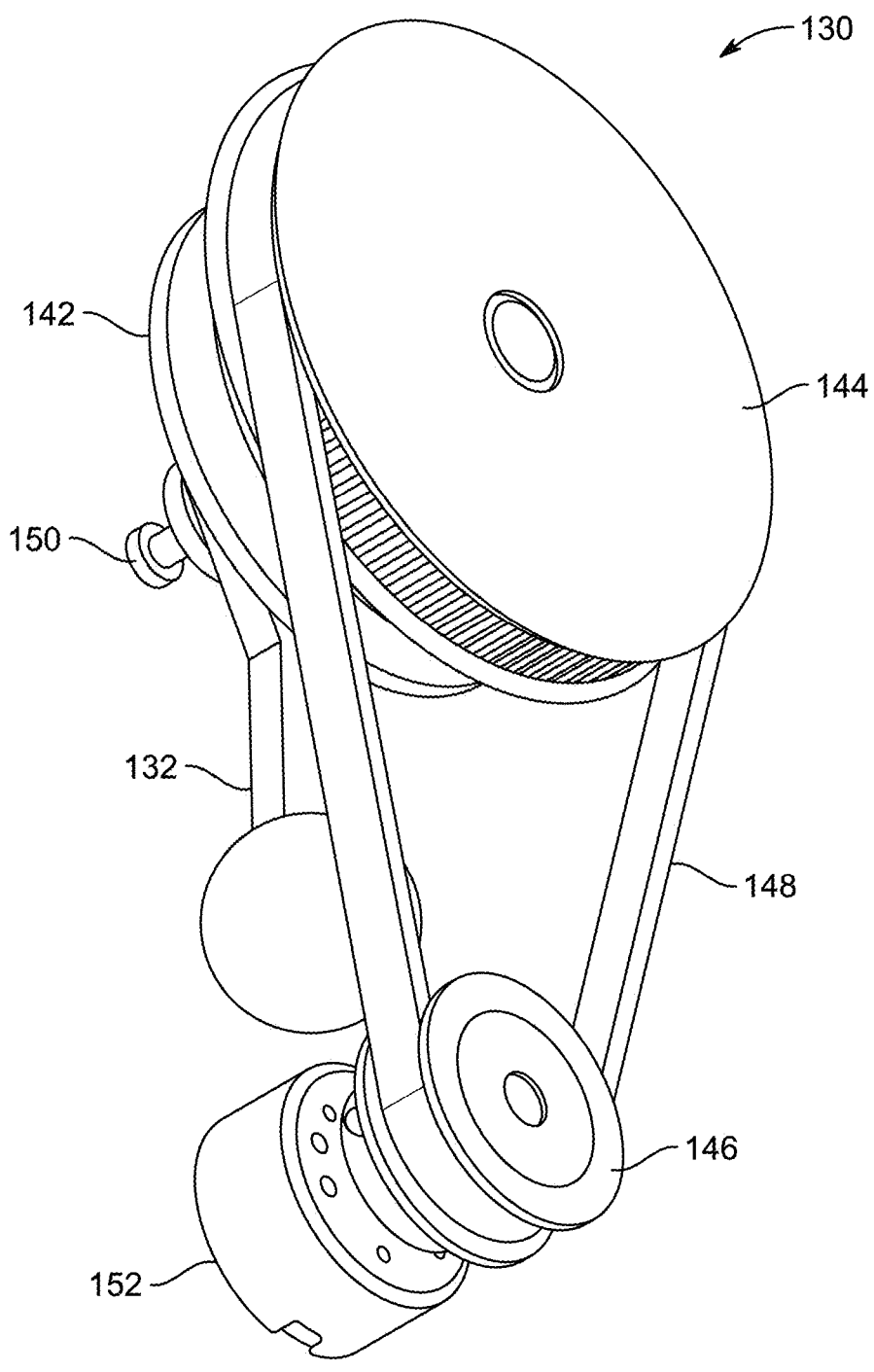
FIG. 4A is an exemplary perspective view of a pendulum assembly of the wearable energy harvesting device, according to certain embodiments.
Figure 4B:
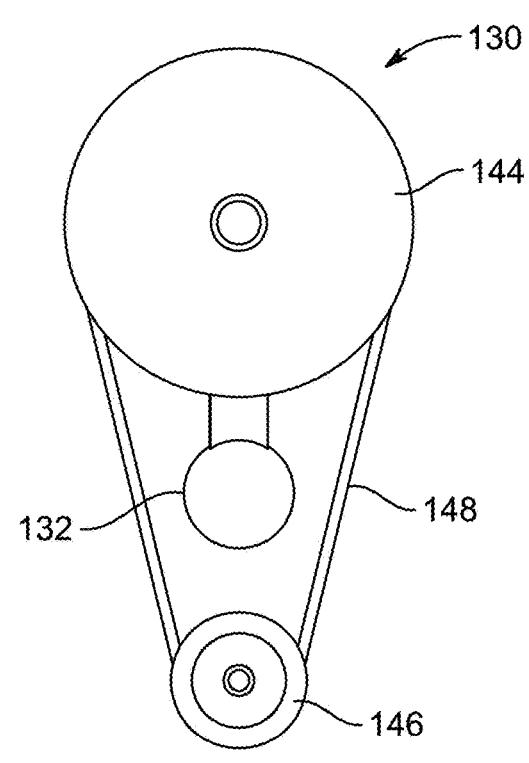
FIG. 4B is an exemplary front view of the pendulum assembly of FIG. 4A, according to certain embodiments.
Figure 4C:
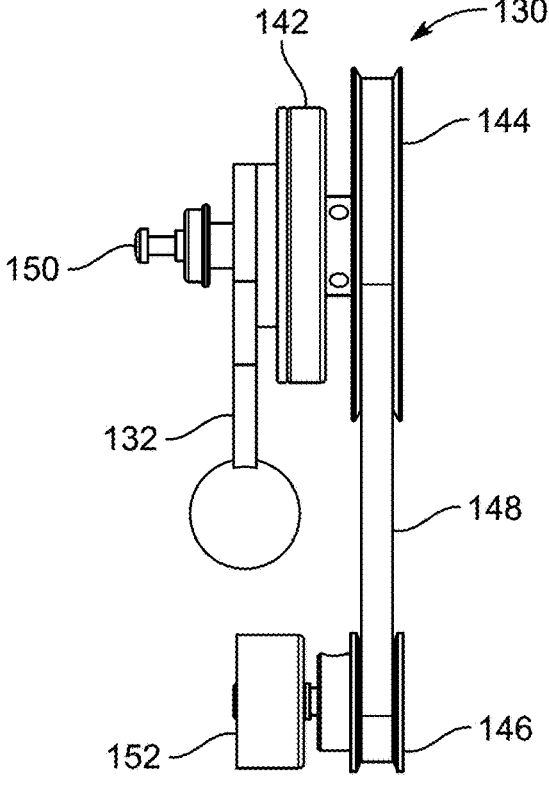
FIG. 4C is an exemplary side view of the pendulum assembly of FIG. 4A, illustrating component relationships thereof, according to certain embodiments.
Figure 5A:
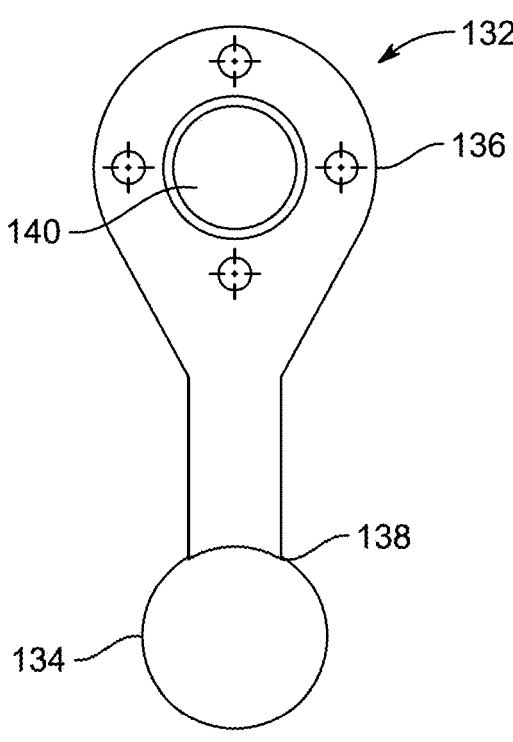
FIG. 5A is an exemplary front view of a pendulum of the pendulum assembly, according to certain embodiments.
Figure 5B:
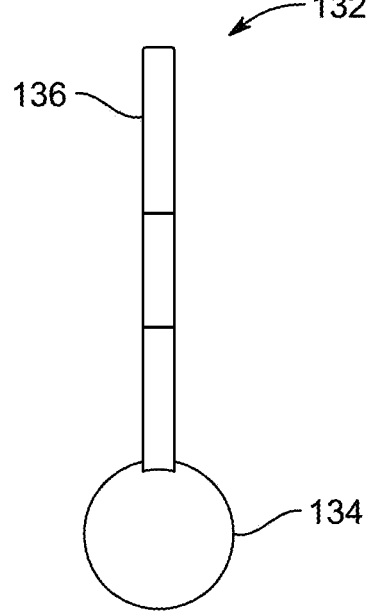
FIG. 5B is an exemplary side view of the pendulum of FIG. 5A, according to certain embodiments.
Figure 6A:
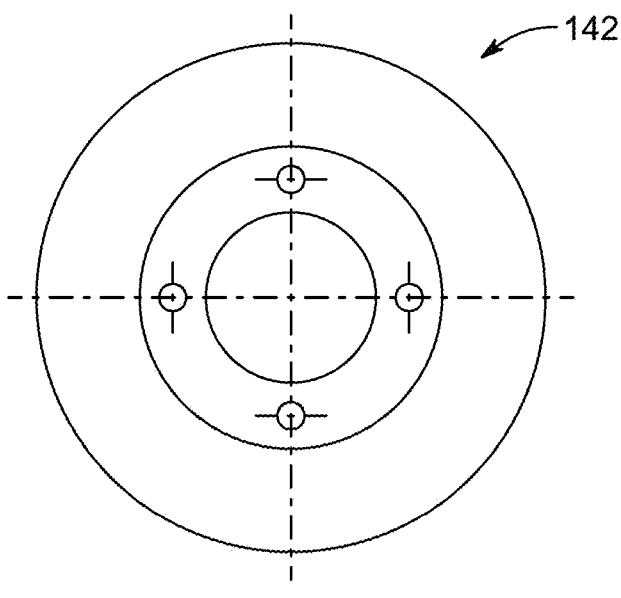
FIG. 6A is an exemplary front view of a flywheel of the pendulum assembly, according to certain embodiments.
Figure 6B:
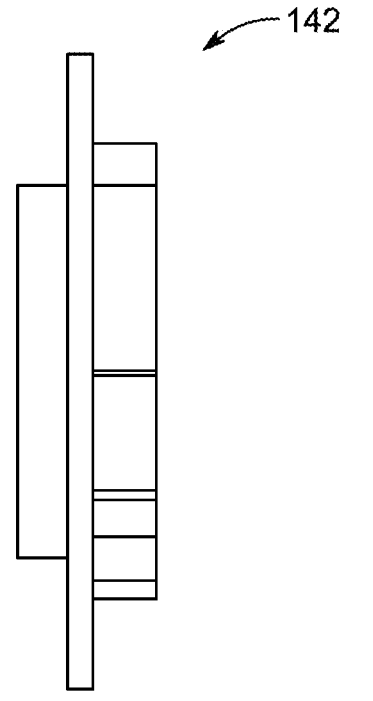
FIG. 6B is an exemplary side view of the flywheel of FIG. 6A, according to certain embodiments.
Figure 7A:
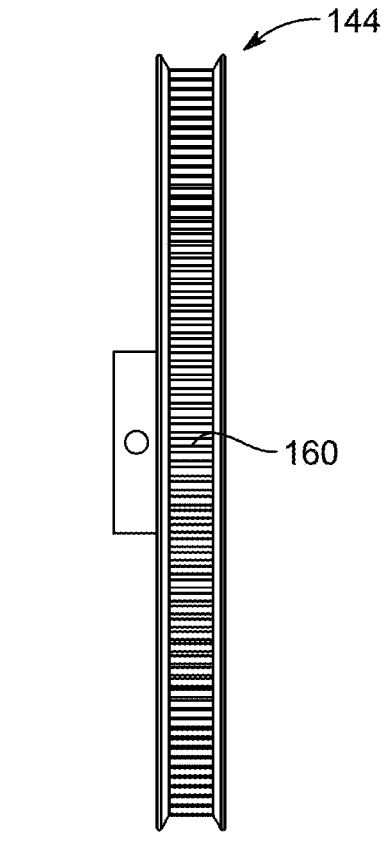
FIG. 7A is an exemplary side view of a first pulley of the pendulum assembly, according to certain embodiments.
Figure 7B:
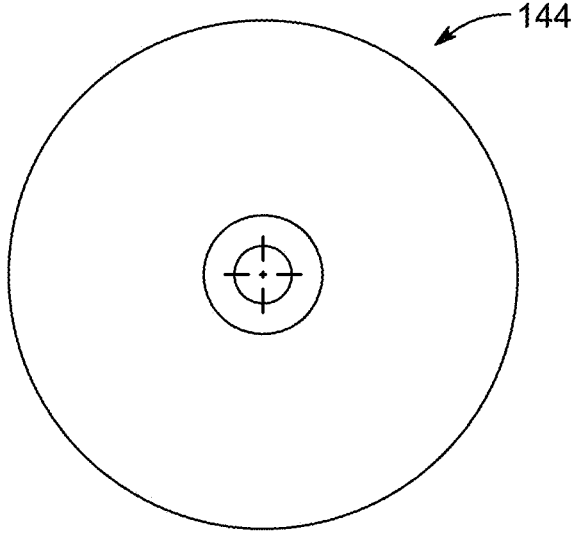
FIG. 7B is an exemplary front view of the first pulley of FIG. 7A, according to certain embodiments.
Figure 8A:
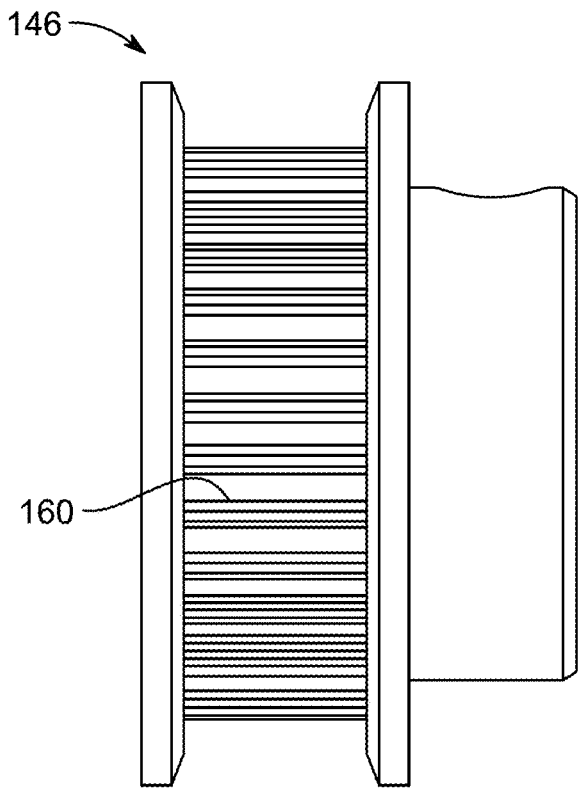
FIG. 8A is an exemplary side view of a second pulley of the pendulum assembly, according to certain embodiments.
Figure 8B:
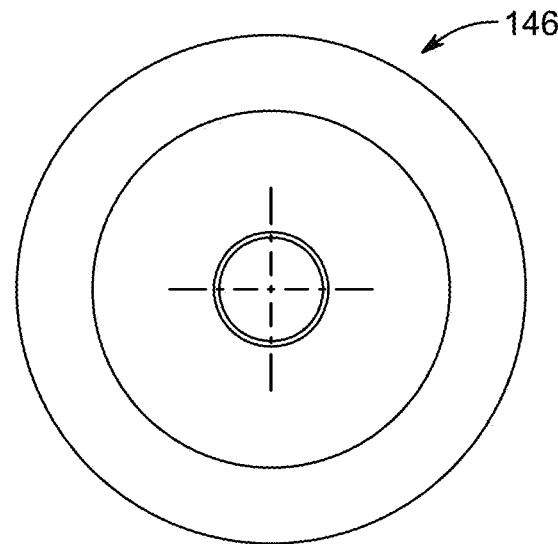
FIG. 8B is an exemplary front view of the second pulley of FIG. 8A, according to certain embodiments.
Figure 10A:
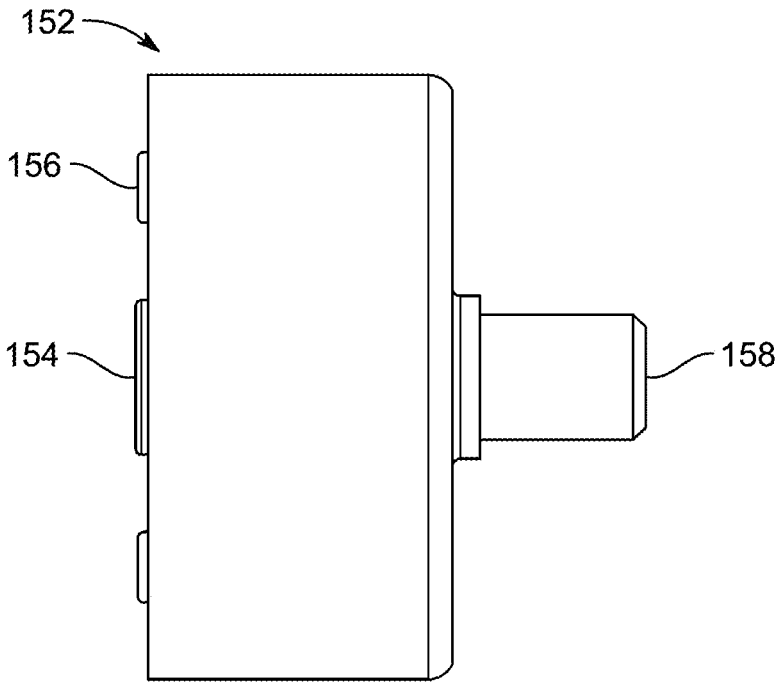
FIG. 10A is an exemplary side view of an electromagnetic generator of the pendulum assembly, according to certain embodiments.
Figure 10B:
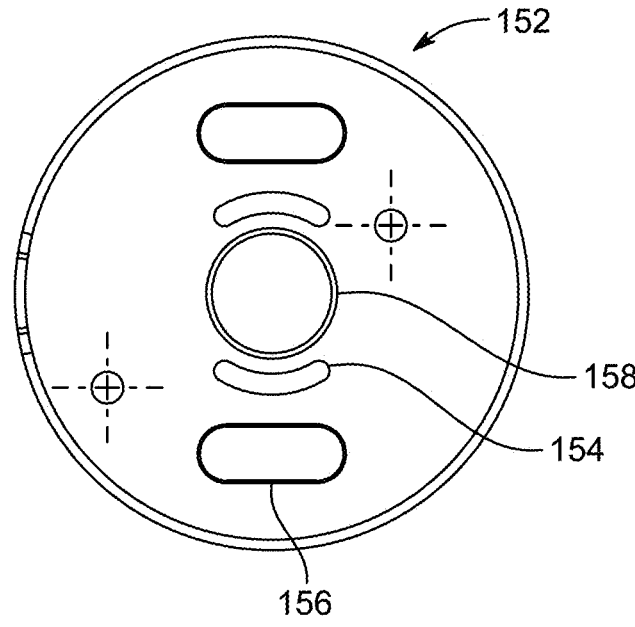
FIG. 10B is an exemplary end view of the electromagnetic generator of FIG. 10A, according to certain embodiments.

Referring to FIGS. 4A-4C, as illustrated, the pendulum assembly 130 comprises a pendulum 132 (shown in FIGS. 5A and 5B in more detail), a flywheel 142 (shown in FIGS. 6A and 6B in more detail), a plurality of pulleys including at least a first pulley 144 (shown in FIGS. 7A and 7B in more detail) and a second pulley 146 (shown in FIGS. 8A and 8B in more detail), a belt 148, and the electromagnetic generator 152 (shown in FIGS. 10A and 10B in more detail). The pendulum assembly 130 forms an integrated mechanical system that captures oscillatory motion from human body movement and converts it into high-speed rotational motion suitable for efficient electromagnetic energy generation. The components of the pendulum assembly 130 are arranged in a kinematic chain that progressively transforms the relatively low-frequency, high-amplitude oscillations of the pendulum 132 into high-frequency, controlled rotational motion at the electromagnetic generator 152. The mechanical coupling between these components is designed to maximize energy transfer efficiency while minimizing losses due to friction, vibration, or mechanical play. The compact arrangement of components of the pendulum assembly 130 minimizes the overall package size and weight while maintaining the structural integrity required for reliable operation under dynamic loading conditions.

Herein, the pendulum 132 comprises a pendulum mass 134 and a pendulum rod 136 having a first end 138 and a second end 140. The pendulum mass 134 is attached to the first end 138 and the second end 140 is pivotally connected to the flywheel 142. The pendulum mass 134 provides the inertial element that responds to acceleration forces generated by human body motion, creating oscillatory motion as the mass tends to remain stationary while the harness 102 and supporting structure move with the leg. The pendulum rod 136 serves as the mechanical linkage between the pendulum mass 134 and the flywheel 142, transmitting the oscillatory forces while allowing the pendulum 132 to swing freely about its pivot point. The first end 138 of the pendulum rod 136 provides a secure attachment point for the pendulum mass 134, which may be implemented as a concentrated weight, a distributed mass element, or a combination of multiple mass components. The second end 140 of the pendulum rod 136 is pivotally connected to the flywheel 142 through a bearing or pivot joint that allows free rotation while transmitting the oscillatory forces to the flywheel assembly.

Such pivotal connection between the second end 140 of the pendulum rod 136 and the flywheel 142 is designed to convert the oscillatory motion of the pendulum 132 into rotational motion of the flywheel 142. As the pendulum 132 oscillates in response to leg motion, the second end 140 of the pendulum rod 136 traces an arcuate path that imparts rotational force to the flywheel 142. The pivotal connection is positioned at a predetermined radius from the center of rotation of the flywheel 142, creating a lever arm that amplifies the torque applied to the flywheel while allowing the pendulum 132 to oscillate through a sufficient angular range to capture energy from leg motion. The bearing arrangement at the pivotal connection is designed to operate with minimal friction while accommodating the multi-directional forces generated during pendulum oscillation and flywheel rotation. This configuration ensures that the oscillatory energy of the pendulum 132 is efficiently transferred to rotational energy in the flywheel 142, establishing the foundation for the subsequent speed amplification and energy generation processes.

In the present embodiments, the flywheel 142 mechanically coupled to the pendulum 132 serves multiple functions within the pendulum assembly 130. The flywheel 142 provides rotational inertia that smooths the intermittent torque pulses generated by the oscillating pendulum 132, converting the oscillatory motion into more continuous rotational motion that can be efficiently transmitted to the speed amplification system. The mass and diameter of the flywheel 142 are selected to provide optimal energy storage and release characteristics, accumulating kinetic energy during the power stroke of the pendulum oscillation and releasing this energy during periods when the pendulum force is reduced or reversed. The flywheel 142 also serves as a mechanical filter that reduces speed variations and torque irregularities, providing a more consistent input to the subsequent pulley and belt system. The rotational inertia of the flywheel 142 helps maintain continuous rotation even when the pendulum motion is irregular or when there are brief interruptions in the walking cycle.

The flywheel 142 is concentrically mounted with the first pulley 144 to form a unified rotating assembly. This concentric mounting arrangement integrates the flywheel 142 and the first pulley 144 functions into a single rotating element, reducing the number of mechanical interfaces and potential sources of energy loss in the system. The unified rotating assembly combines the inertial properties of the flywheel 142 with the speed amplification function of the first pulley 144, creating a compact and efficient power transmission element. The concentric mounting ensures that the flywheel 142 and the first pulley 144 rotate at identical speeds, eliminating any relative motion or slippage between these components. This configuration also simplifies the mechanical design and reduces the overall size and weight of the pendulum assembly 130 while maintaining the functional benefits of both the flywheel and pulley elements.

The unified rotating assembly is supported by appropriate bearings that allow free rotation while supporting the radial and axial loads generated during operation. The bearing system is designed to operate with minimal friction and wear over extended periods of use, ensuring long-term reliability and energy efficiency of the pendulum assembly 130. The concentric arrangement of the flywheel 142 and the first pulley 144 also provides improved dynamic balance, reducing vibration and noise during operation while enhancing the overall smoothness of the energy harvesting process. The structural integration of these components creates an assembly that can withstand the dynamic loading conditions encountered during normal walking activities while maintaining precise mechanical alignment for optimal energy transfer efficiency.

Figure 9A:
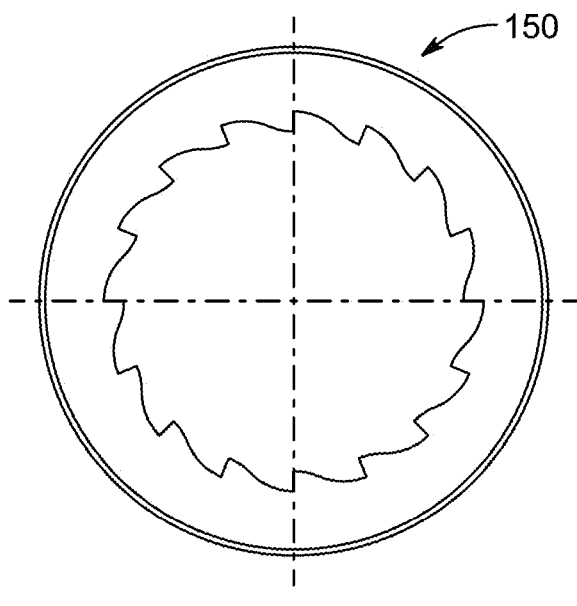
FIG. 9A is an exemplary front view of a ratchet gear of the pendulum assembly, according to certain embodiments.
Figure 9B:
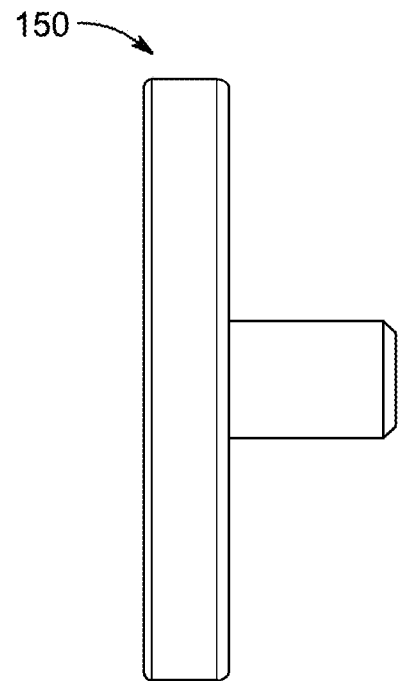
FIG. 9B is an exemplary side view of the ratchet gear of FIG. 9A, according to certain embodiments.

In the present documents, the first pulley 144 is mechanically connected to the flywheel 142, and the second pulley 146 has a smaller diameter than the first pulley 144 and is mechanically connected to a ratchet gear 150 (as shown in FIGS. 9A-9B in detail). As may be seen from FIGS. 7A-7B and 8A-8B, the first pulley 144 has a larger diameter than the second pulley 146 to provide rotational speed amplification. This speed amplification is required for achieving the high rotational speeds required for efficient electromagnetic energy generation, as electromagnetic generators typically produce higher power output at increased rotational speeds. The diameter ratio between the first pulley 144 and the second pulley 146 determines the speed amplification factor, with larger ratios providing greater speed increase but requiring higher torque input from the flywheel and pendulum system. The specific diameter ratio is selected to balance the available torque from the pendulum oscillation with the speed requirements of the electromagnetic generator 152, optimizing the overall energy conversion efficiency of the system.

Herein, each pulley of the plurality of pulleys 144, 146 comprises a circumferential groove 160 configured to receive the belt 148. The circumferential groove 160 is shaped to match the cross-sectional profile of the belt 148, ensuring positive engagement between the belt 148 and the pulley 144, 146 that prevents slippage during operation. The groove profile may include features such as V-shaped sides, flat bottoms, or specialized contours that enhance belt retention and power transmission efficiency. The circumferential groove 160 extends around the complete circumference of each pulley 144, 146, providing continuous engagement with the belt 148 throughout the full rotation cycle. The depth and width of the circumferential groove 160 are designed to accommodate the belt 148 while providing adequate clearance for thermal expansion and normal manufacturing tolerances.

The belt 148 connecting the first pulley 144 to the second pulley 146 serves as the primary power transmission element in the speed amplification system. The belt 148 is designed to transmit rotational power from the larger first pulley 144 to the smaller second pulley 146 while accommodating the center distance between these components and any minor misalignment that may occur during operation. The belt 148 may be implemented as a flat belt, V-belt, timing belt, or other suitable power transmission belt configuration depending on the specific power transmission requirements and mechanical constraints of the system. The material and construction of the belt 148 are selected to provide adequate strength, durability, and flexibility for the operating conditions encountered in the wearable energy harvesting device 100. For present purposes, the belt 148 is designed to maintain consistent tension and engagement with both pulleys 144, 146 throughout the range of dynamic loading conditions experienced during normal walking activities.

Further, herein, the ratchet gear 150 mechanically connected to the second pulley 146 performs the function of converting bidirectional rotation into unidirectional rotation suitable for driving the electromagnetic generator 152. The ratchet gear 150 is directly connected to the second pulley 146, creating a mechanical assembly that rotates together as a single unit while providing the directional conversion functionality. During normal pendulum oscillation, the flywheel 142 and the first pulley 144 rotate alternately in clockwise and counterclockwise directions as the pendulum 132 swings back and forth. This bidirectional rotation is transmitted through the belt 148 to the second pulley 146, which would normally also rotate in both directions. The ratchet gear 150 intervenes in this power transmission path to allow rotation in only one direction while disengaging during rotation in the opposite direction, ensuring that the electromagnetic generator 152 receives only unidirectional rotational input.

In an example configuration, as shown in FIGS. 9A and 9B, the ratchet gear 150 incorporates a pawl and ratchet mechanism that engages during rotation in the desired direction and disengages during rotation in the opposite direction. The ratchet mechanism includes a series of angled teeth formed around the circumference of the ratchet gear 150, with each tooth having a gradual slope on one side and a steep face on the opposite side. A spring-loaded pawl element engages with these teeth to provide positive drive in the forward direction while allowing overrunning in the reverse direction. When the second pulley 146 rotates in the forward direction, the pawl engages with the steep faces of the ratchet teeth, creating a positive mechanical connection that transmits torque to the electromagnetic generator 152. When the second pulley 146 attempts to rotate in the reverse direction, the pawl slides over the gradual slopes of the ratchet teeth, allowing the second pulley 146 to rotate freely without transmitting reverse torque to the electromagnetic generator 152.

In the present configuration, the ratchet gear 150 provides several advantages for the energy harvesting application beyond simple directional conversion. The ratchet action allows the electromagnetic generator 152 to continue rotating in the forward direction even when the pendulum 132 is swinging in the reverse direction, utilizing the rotational inertia of the generator rotor to maintain power generation throughout the complete pendulum cycle. This continuous rotation capability significantly improves the duty cycle and overall power output of the present energy harvesting system compared to systems that stop and reverse with each pendulum oscillation. The ratchet gear 150 also provides mechanical isolation between the electromagnetic generator 152 and the pendulum system during reverse motion, preventing the generator from acting as a brake that would reduce the pendulum oscillation amplitude. This isolation allows the pendulum 132 to swing more freely, maintaining higher oscillation amplitudes and improving the overall energy capture efficiency of the system.

Further, in the wearable energy harvesting device 100, the electromagnetic generator 152 mechanically coupled to the ratchet gear assembly converts the rotational mechanical energy into electrical energy through electromagnetic induction. Herein, the electromagnetic generator 152 comprises a magnet assembly 154 and a coil assembly 156 configured for electromagnetic induction. The magnet assembly 154 includes one or more permanent magnets arranged to create a strong magnetic field that rotates relative to the coil assembly 156 as the generator shaft rotates. The coil assembly 156 includes multiple turns of electrical conductor wire arranged to intersect the rotating magnetic field, inducing electrical current according to Faraday law of electromagnetic induction. The relative motion between the magnet assembly 154 and the coil assembly 156 generates an alternating electrical current that can be rectified and conditioned for use in charging energy storage devices or powering external electronic equipment.

The electromagnetic generator 152 further comprises an output shaft 158 extending therefrom to the ratchet gear 150. The output shaft 158 provides the mechanical interface between the electromagnetic generator 152 and the ratchet gear 150, transmitting rotational motion from the ratchet gear 150 to rotor assembly of the electromagnetic generator 152. The output shaft 158 is supported by appropriate bearings within housing of the electromagnetic generator 152, allowing smooth rotation while supporting the radial and axial loads generated during operation. The length of the output shaft 158 is designed to accommodate the spacing requirements between the ratchet gear 150 and the electromagnetic generator 152 within the overall package constraints of the pendulum assembly 130. The output shaft 158 may also incorporate appropriate coupling features, such as keyways, splines, or threaded connections, to ensure positive engagement with the ratchet gear 150 while allowing for assembly and disassembly during manufacturing and maintenance operations.

In the present configuration, the electromagnetic generator 152 is positioned at a distance from the ratchet gear 150 and the second pulley 146 corresponding to a length of the output shaft 158. This spacing arrangement allows the electromagnetic generator 152 to be positioned in an optimal location within the pendulum assembly 130 while maintaining proper mechanical connection to the power transmission system. The positioning of the electromagnetic generator 152 considers factors such as weight distribution, accessibility for maintenance, protection from environmental factors, and integration with the overall harness design. The distance created by the output shaft 158 also provides mechanical isolation between the electromagnetic generator 152 and the other rotating components, reducing the transmission of vibrations and mechanical noise that could affect user comfort or system performance. This spacing arrangement contributes to the overall compactness and efficiency of the pendulum assembly 130 while maintaining optimal performance of each individual component.

For purposes of the present disclosure, the electromagnetic generator 152 is adapted to operate efficiently at the rotational speeds provided by the speed amplification system, typically requiring rotational speeds significantly higher than the natural oscillation frequency of the pendulum 132. The magnet assembly 154 may be configured as the rotor element, rotating within a stationary coil assembly 156, or alternatively the coil assembly 156 may rotate within a stationary magnet assembly 154, depending on the specific generator design and performance requirements. The electromagnetic generator 152 includes appropriate electrical connections for conducting the generated electrical current to external circuits, typically through slip rings, brushes, or other rotating electrical connections for rotating coil designs, or through direct connections for stationary coil designs. The electrical output characteristics of the electromagnetic generator 152, including voltage, current, and frequency, are determined by factors such as the magnetic field strength, the number of coil turns, the rotational speed, and the generator geometry.

The wearable energy harvesting device 100 further comprises an energy storage element (not shown in the accompanied drawings) electrically connected to the electromagnetic generator 152. Herein, the energy storage element is selected from the group consisting of a rechargeable battery and a supercapacitor. The energy storage element provides a means for accumulating the electrical energy generated by the electromagnetic generator 152 during periods of active energy harvesting and storing this energy for later use when energy harvesting is not occurring or when power demand exceeds the instantaneous generation capacity. The rechargeable battery option provides high energy density storage suitable for applications requiring extended operation between charging cycles, while the supercapacitor option provides high power density storage suitable for applications requiring rapid charging and discharging cycles. The selection between rechargeable battery and supercapacitor technologies depends on the specific application requirements, including desired energy capacity, charge and discharge rates, operating voltage ranges, and environmental operating conditions.

It may be understood that the energy storage element is electrically connected to the electromagnetic generator 152 through appropriate power conditioning circuitry that converts the alternating current output of the generator into the direct current required for charging the storage element. This power conditioning circuitry may include rectification circuits, voltage regulation circuits, and charge management circuits that optimize the charging process and protect the energy storage element from overcharging, over-discharging, or other potentially damaging conditions. The electrical connection between the electromagnetic generator 152 and the energy storage element is designed to minimize power losses during the energy transfer process while providing appropriate electrical isolation and protection features. The energy storage element may be integrated into the pendulum assembly 130 or may be positioned elsewhere within structure of the harness 102, depending on factors such as weight distribution, accessibility, and thermal management requirements.

The wearable energy harvesting device 100 further comprises an energy management circuit (not shown in the accompanied drawings) electrically connected to the electromagnetic generator 152. The energy management circuit performs multiple functions related to optimizing the energy harvesting process and conditioning the electrical output for use by external devices or energy storage systems. The energy management circuit includes power conversion functionality that transforms the variable amplitude and frequency alternating current output of the electromagnetic generator 152 into regulated direct current suitable for charging batteries or powering electronic devices. The energy management circuit may also include monitoring and control functions that track the energy generation and consumption patterns, optimizing the operation of the system for maximum efficiency under varying operating conditions. The energy management circuit may further implement maximum power point tracking algorithms that adjust the electrical loading on the electromagnetic generator 152 to extract maximum power under different rotational speed and torque conditions.

The energy management circuit provides electrical interfaces for connecting external electronic devices to the energy harvesting system, ensuring that the electrical characteristics of the harvested energy are compatible with the requirements of the connected devices. The energy management circuit may incorporate protection features such as overvoltage protection, overcurrent protection, and short circuit protection that prevent damage to both the energy harvesting system and connected external devices. The energy management circuit may also include communication interfaces that allow external devices to monitor the status of the energy harvesting system, including parameters such as power generation rate, energy storage level, and system health indicators. These communication capabilities facilitate integration of the wearable energy harvesting device 100 with smart devices and systems that can optimize their power consumption based on the available harvested energy.

The wearable energy harvesting device 100 is configured to power an external electronic device (not shown in the accompanied drawings) selected from the group consisting of a mobile phone charger, a smartwatch, a fitness tracker, and a portable fan. The mobile phone charger application represents one of the most practical and widely applicable uses for harvested energy, as mobile devices require regular charging and are commonly carried during walking activities when energy can be harvested. The power requirements for mobile phone charging typically range from 5 to 15 watts, which is within the capability range of an efficiently designed wearable energy harvesting system during moderate to vigorous walking activities. The smartwatch application represents a lower power but continuous usage scenario, where the harvested energy can supplement or replace the need for regular battery charging of the wearable device. Fitness tracker applications similarly benefit from continuous energy supplementation, extending battery life and enabling enhanced monitoring capabilities that would otherwise consume excessive battery power. The portable fan application represents a direct comfort enhancement use case where harvested energy can power personal cooling devices during periods of physical activity when both energy generation and cooling needs are highest. This application demonstrates the immediate utility of harvested energy for enhancing user comfort and safety during outdoor activities, particularly in warm environments where walking or hiking generates both energy harvesting opportunities and increased cooling needs.

The energy management circuit is configured to provide appropriate voltage and current levels for each of these application categories, with the capability to detect the connected device type and adjust output characteristics accordingly. The system may include multiple output ports or switchable output configurations to accommodate different device charging requirements and connector types. The versatility of the applications by the external electronic device demonstrates the broad utility of the wearable energy harvesting device 100 across multiple user scenarios and activity levels. The energy output characteristics can be tailored to match specific application requirements through configuration of parameters of the electromagnetic generator 152, the energy storage element, and the energy management circuit. For high-power applications such as mobile phone charging, the system emphasizes maximum power transfer and rapid energy accumulation during periods of active walking. For low-power continuous applications such as fitness tracking devices, the system emphasizes steady power delivery and efficient utilization of smaller amounts of harvested energy. The modular design of the electrical system allows for field reconfiguration or upgrade to accommodate new device types and changing user requirements over the operational life of the wearable energy harvesting device 100.

Figure 11:
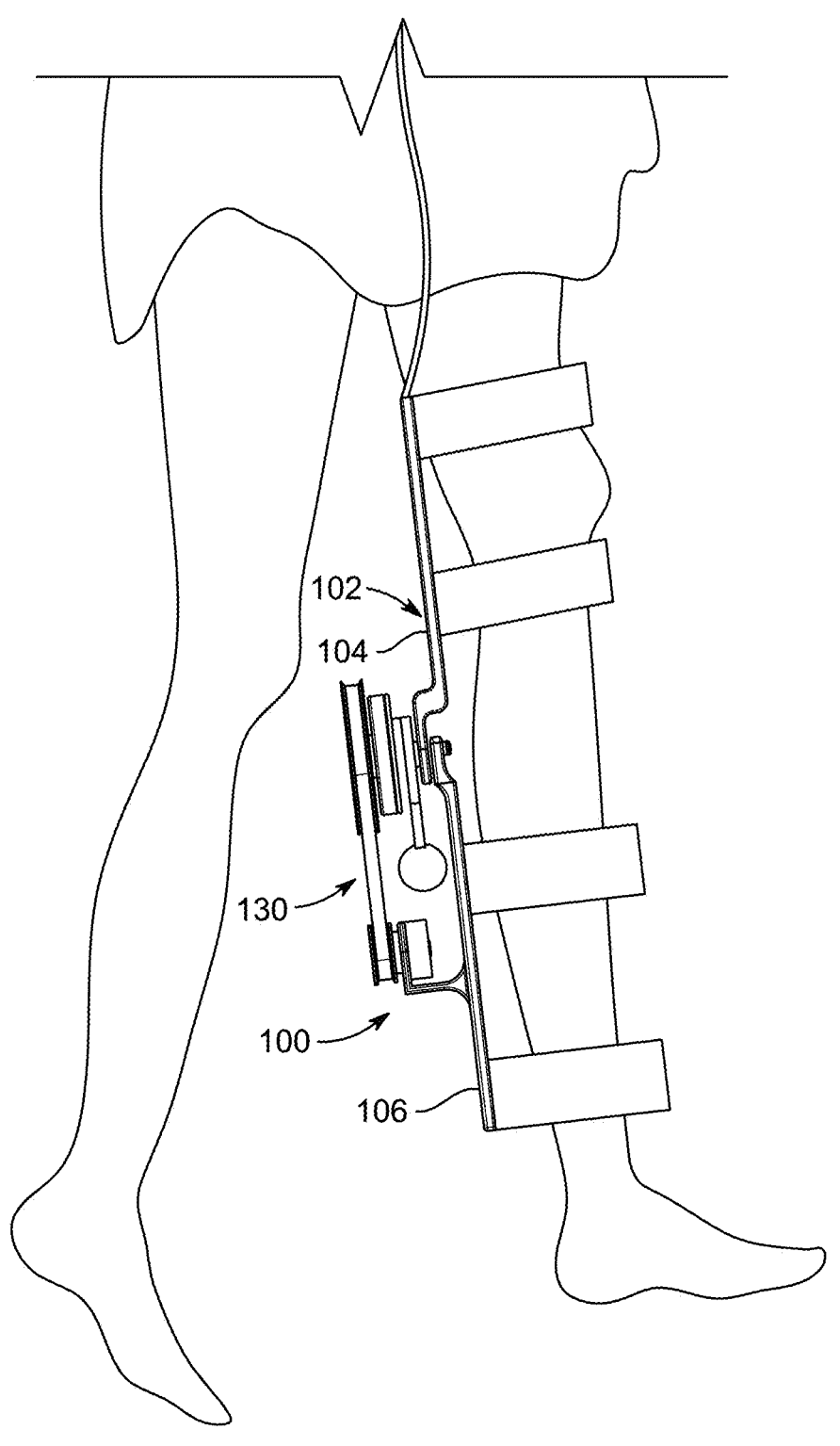
FIG. 11 is an exemplary environmental view illustrating the wearable energy harvesting device attached to a human leg, according to certain embodiments.

Referring to FIG. 11, illustrated is a depiction showing implementation of the wearable energy harvesting device 100 attached to a human leg during normal use. The depiction demonstrates the practical implementation of configuration of the harness 102, showing how the upper portion 104 and the lower portion 106 conform to the natural contours of the human leg while providing secure attachment for the pendulum assembly 130. The positioning of the pendulum assembly 130 on the lower portion 106 places the energy harvesting components in the region of the leg that experiences significant acceleration patterns during walking, optimizing the energy capture efficiency. The harness 102 design accommodates the natural range of motion of the leg and knee joint through the articulated connection, allowing unrestricted movement while maintaining proper positioning of the energy harvesting components.

This implementation illustrates the compact and unobtrusive nature of the wearable energy harvesting device 100, demonstrating that the system can be worn during normal daily activities without significantly altering gait patterns or causing discomfort. The weight distribution achieved through the harness 102 design spreads the mass of the pendulum assembly 130 and associated components across multiple contact points, reducing pressure concentrations and enhancing user acceptance. The implementation shows how the energy harvesting components are positioned to minimize interference with clothing, other wearable devices, or normal leg movement patterns. The overall package size and shape are optimized for wearability while maintaining the mechanical requirements for effective energy harvesting from human body motion. This implementation validates the practical utility of the mechanical design and confirms that the energy harvesting functions can be achieved without compromising user comfort, mobility, or safety during normal walking activities.

Figure 12:
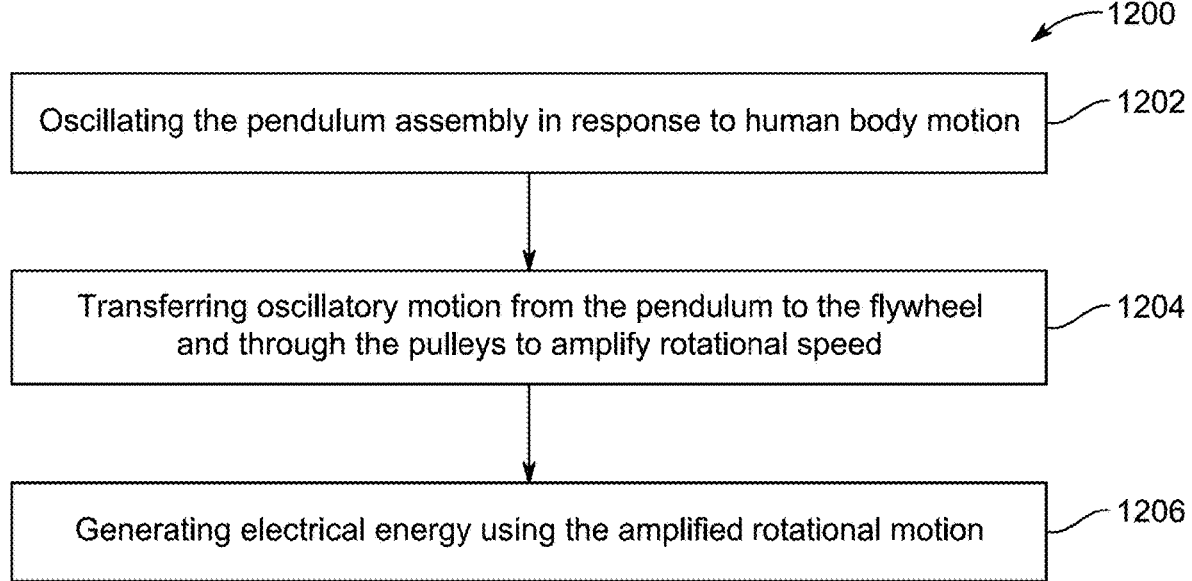
FIG. 12 is an exemplary flowchart illustrating a method of harvesting energy from human body motion, according to certain embodiments.

Referring to FIG. 12, illustrated is a flowchart of a method 1200 of harvesting energy from human body motion using the wearable energy harvesting device 100. The method 1200 includes a series of steps. These steps are only illustrative, and other alternatives may be considered where one or more steps are added, one or more steps are removed, or one or more steps are provided in a different sequence without departing from the scope of the present disclosure. Various variants described above, with respect to the aforementioned wearable energy harvesting device 100 apply mutatis mutandis to the present method 1200.

At step 1202, the method 1200 includes oscillating the pendulum assembly 130 in response to human body motion. The oscillating of the pendulum assembly 130 occurs naturally as the user walks or engages in other leg movement activities, with the pendulum 132 responding to the acceleration patterns generated by the changing velocity and direction of leg motion. The pendulum mass 134 tends to remain stationary due to inertia while the harness 102 and supporting structure move with the leg, creating relative motion that causes the pendulum 132 to oscillate about its pivot point. The amplitude and frequency of the pendulum oscillation depend on factors such as walking speed, stride length, terrain characteristics, and individual gait patterns. The pendulum assembly 130 is designed to respond effectively to the typical range of acceleration patterns encountered during normal walking activities, with the pendulum parameters optimized to maximize energy capture across a broad range of user activity levels.

The oscillating motion of the pendulum assembly 130 is sustained continuously during walking activities, with each step providing renewed excitation that maintains or increases the oscillation amplitude. The pendulum system is designed with appropriate damping characteristics that prevent excessive oscillation buildup while maintaining sufficient amplitude for effective energy harvesting. The response characteristics of the pendulum assembly 130 are tuned to the typical frequency content of human walking motion, ensuring efficient energy transfer from the leg motion to the pendulum oscillation. The oscillating process continues automatically without requiring conscious user input or control, making the energy harvesting process transparent to the user during normal activities.

At step 1204, the method 1200 includes transferring oscillatory motion from the pendulum 132 to the flywheel 142 and through the pulleys to amplify rotational speed. The transferring of oscillatory motion begins with the pivotal connection between the second end 140 of the pendulum rod 136 and the flywheel 142, which converts the arcuate motion of the pendulum into rotational motion of the flywheel. As the pendulum 132 oscillates, the flywheel 142 accumulates rotational energy and smooths the intermittent torque pulses, providing more consistent rotational input to the speed amplification system. The rotational motion of the flywheel 142 is transmitted to the first pulley 144 through their concentric mounting arrangement, maintaining the rotational energy while preparing it for speed amplification through the belt and pulley system. The belt 148 transfers the rotational motion from the larger first pulley 144 to the smaller second pulley 146, increasing the rotational speed according to the diameter ratio between the pulleys.

This speed amplification process is required for achieving the high rotational speeds required for efficient electromagnetic energy generation, as the natural oscillation frequency of the pendulum 132 is typically much lower than the optimal operating speed of the electromagnetic generator 152. The pulley system transforms the relatively high-torque, low-speed rotation of the flywheel 142 into lower-torque, high-speed rotation suitable for driving the electromagnetic generator. The speed amplification factor is determined by the diameter ratio between the first pulley 144 and second pulley 146, with typical amplification factors ranging from 3:1 to 10:1 depending on the specific design requirements and operating conditions. The transferring process maintains energy conservation principles, with the product of torque and speed remaining approximately constant while accounting for mechanical losses in the belt and pulley system.

At step 1206, the method 1200 includes generating electrical energy using the amplified rotational motion. The generating of electrical energy occurs in the electromagnetic generator 152, where the high-speed rotational motion from the speed amplification system drives relative motion between the magnet assembly 154 and the coil assembly 156. The rotating magnetic field created by the magnet assembly 154 induces electrical current in the coil assembly 156 according to Faraday law of electromagnetic induction, with the magnitude of the induced current depending on factors such as the magnetic field strength, the rate of change of magnetic flux, and the number of turns in the coil assembly. The electrical energy generation process converts the mechanical rotational energy into alternating electrical current that can be further processed and utilized for powering external devices or charging energy storage elements.

The method 1200 further comprises converting bidirectional rotation of the pendulum 132 to unidirectional rotation with the ratchet gear 150, where the unidirectional rotation drives the electromagnetic generator 152. The converting process occurs automatically through the mechanical action of the ratchet gear 150, which allows power transmission only in the forward direction while disengaging during reverse rotation of the pendulum system. This unidirectional conversion ensures that the electromagnetic generator 152 rotates consistently in one direction, maintaining continuous power generation throughout the pendulum oscillation cycle and preventing the electromagnetic generator 152 from acting as a brake during reverse pendulum motion. The ratchet mechanism also allows the electromagnetic generator 152 to continue rotating due to its rotational inertia even when the pendulum 132 momentarily stops or reverses direction, improving the duty cycle and overall power output of the present energy harvesting system.

The method 1200 further comprises storing the electrical energy in an energy storage device. The storing process involves directing the electrical output from the electromagnetic generator 152 through appropriate power conditioning circuitry to charge the energy storage element, which may be implemented as a rechargeable battery or supercapacitor depending on the specific application requirements. The power conditioning circuitry converts the alternating current output of the electromagnetic generator 152 into direct current suitable for charging the energy storage element, while also providing appropriate voltage regulation and charge management functions. The stored electrical energy accumulates over time during periods of active energy harvesting, providing a reservoir of power that can be utilized when energy harvesting is not occurring or when power demand exceeds the instantaneous generation capacity.

Herein, the electrical energy is directed through the energy management circuit to an external device. The directing process involves routing the electrical energy from either the electromagnetic generator 152 directly or from the energy storage element through the energy management circuit, which conditions the power to meet the specific requirements of the connected external device. The energy management circuit provides appropriate voltage levels, current limiting, and electrical protection functions to ensure safe and efficient power delivery to external devices such as mobile phone chargers, smartwatches, fitness trackers, or portable fans. The directing process may occur simultaneously with energy storage, allowing the system to both charge internal energy storage elements and power external devices during periods of active energy generation.

The method 1200 operates continuously and automatically during walking or other leg movement activities, requiring no conscious user intervention or control actions. The energy harvesting process scales naturally with activity level, generating more power during vigorous walking or running activities and less power during slower or intermittent movement. The method accommodates variations in user gait patterns, terrain conditions, and activity types while maintaining effective energy harvesting performance across a broad range of operating conditions. The automated nature of the method 1200 makes the energy harvesting process transparent to the user while providing continuous power generation capability for extended periods of use.

The wearable energy harvesting device 100 of the present disclosure provides a solution that addresses the limitations of existing energy harvesting approaches by integrating mechanical efficiency with user comfort and practical wearability. The wearable energy harvesting device 100 achieves higher energy conversion efficiency through the combination of pendulum-based motion capture, flywheel energy storage, speed amplification through a belt and pulley system, and unidirectional conversion through a ratchet gear mechanism, enabling practical power levels for real-world applications. The harness design with articulated upper and lower portions connected by hinges accommodates natural leg movement while providing secure attachment, reducing user fatigue and enhancing acceptance for extended wear periods compared to rigid mounting systems.

The wearable energy harvesting device 100 of the present disclosure offers advantages in energy conversion efficiency, user comfort, and practical applicability compared to existing energy harvesting solutions. The integrated design approach combines multiple energy conversion technologies within a single wearable package, eliminating the need for separate systems while achieving higher overall efficiency through optimized mechanical coupling between human motion and power generation components. The wearable energy harvesting device 100 provides sufficient power output for practical applications such as mobile device charging while maintaining a form factor and weight distribution that allows comfortable wear during normal daily activities, addressing the fundamental challenges that have limited the adoption of wearable energy harvesting technologies.

Numerous modifications and variations of the present disclosure are possible in light of the above teachings. It is therefore to be understood that within the scope of the appended claims, the invention may be practiced otherwise than as specifically described herein.

The invention claimed is:

1. A wearable energy harvesting device, comprising:
a harness configured to be attached to a human leg, the harness comprising an upper portion and a lower portion, wherein the upper and lower portions each have an inner support member and an outer support member, the inner support members configured for placement along an inside of the human leg and the outer support members configured for placement along an outside of the human leg opposite the inner support members, wherein the upper portion is connected to the lower portion by an inner hinge disposed between an upper inner support member and a lower outer support member,
a pendulum assembly attached to the harness and configured to oscillate in response to human body motion, the pendulum assembly comprising:
a pendulum;
a flywheel mechanically coupled to the pendulum:
a plurality of pulleys including at least a first pulley mechanically connected to the flywheel and a second pulley having a smaller diameter than the first pulley and mechanically connected to a ratchet gear;
a belt connecting the first pulley to the second pulley; and
an electromagnetic generator mechanically coupled to the ratchet gear;
wherein the pendulum is disposed between an outer hinge, which is disposed on a lower inner support member, and the flywheel.

2. The wearable energy harvesting device of claim 1, wherein the pendulum comprises a pendulum mass and a pendulum rod having a first end and a second end, wherein the pendulum mass is attached to the first end and the second end is pivotally connected to the flywheel.

3. The wearable energy harvesting device of claim 1, wherein the flywheel is concentrically mounted with the first pulley to form a unified rotating assembly.

4. The wearable energy harvesting device of claim 1, wherein the electromagnetic generator comprises a magnet assembly and a coil assembly configured for electromagnetic induction.

5. The wearable energy harvesting device of claim 1, wherein the upper portion further comprises a plurality of upper straps; and the lower portion further comprises a plurality of lower straps.

6. The wearable energy harvesting device of claim 1, wherein the first pulley has a larger diameter than the second pulley to provide rotational speed amplification.

7. The wearable energy harvesting device of claim 1, wherein the electromagnetic generator comprises an output shaft extending therefrom to the ratchet gear.

8. The wearable energy harvesting device of claim 1, wherein the pendulum assembly is mounted on the lower portion of the harness.

9. The wearable energy harvesting device of claim 1, wherein the pendulum assembly is pivotally mounted at the outer hinge between the upper portion and the lower portion.

10. The wearable energy harvesting device of claim 1, wherein each pulley of the plurality of pulleys comprises a circumferential groove configured to receive the belt.

11. The wearable energy harvesting device of claim 1, wherein the lower portion of the harness comprises a mounting bracket, and wherein the electromagnetic generator is mounted on the mounting bracket.

12. A method of harvesting energy from human body motion using the wearable energy harvesting device of claim 1, comprising:

oscillating the pendulum assembly in response to human body motion;

transferring oscillatory motion from the pendulum to the flywheel and through the pulleys; and generating electrical energy using the amplified rotational motion.

13. The method of claim 12, further comprising:

converting bidirectional rotation of the pendulum to uni-directional rotation with the ratchet gear, wherein the unidirectional rotation drives the electromagnetic generator.

14. The method of claim 12, further comprising:

storing the electrical energy in an energy storage device.

15. The method of claim 12, wherein the electrical energy is directed through the energy management circuit to an external device.

* * * * *